United States Patent
Ishikawa et al.

(10) Patent No.: US 7,993,179 B2
(45) Date of Patent: Aug. 9, 2011

(54) METHOD OF MANUFACTURING DISPLAY UNIT

(75) Inventors: Seiji Ishikawa, Kawasaki (JP); Jun Ooida, Mobara (JP); Yoshinori Muramatsu, Tokyo (JP); Takahiro Miyazaki, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 652 days.

(21) Appl. No.: 12/015,534

(22) Filed: Jan. 17, 2008

(65) Prior Publication Data
US 2008/0176478 A1    Jul. 24, 2008

(30) Foreign Application Priority Data
Jan. 24, 2007 (JP) .................................. 2007-013805

(51) Int. Cl.
H01J 9/24 (2006.01)

(52) U.S. Cl. .......................................... 445/24; 347/234

(58) Field of Classification Search .............. 445/24–25; 347/234
See application file for complete search history.

(56) References Cited

U.S. PATENT DOCUMENTS
6,760,054 B1 *  7/2004  Okuyama ..................... 347/234
7,372,478 B2 *  5/2008  Oshida et al. ................. 347/234

FOREIGN PATENT DOCUMENTS
JP    2001-142225    5/2001
JP    2002-287106   10/2002

* cited by examiner

Primary Examiner — Anne M Hines
(74) Attorney, Agent, or Firm — Antonelli, Terry, Stout & Kraus, LLP.

(57) ABSTRACT

An exposure method that suppresses distribution of pattern shapes at the time of exposure.
In a manufacturing method for a display unit, a layer forming a reference for pattern arrangement is determined among layers formed on a panel. An arrangement of a pattern in a layer above the reference layer is determined using a value obtained from distribution of the pattern arrangement in the reference layer.

7 Claims, 8 Drawing Sheets

METHOD OF MANUFACTURING DISPLAY UNIT

BACKGROUND OF THE INVENTION

The present invention relates to a method of manufacturing a display unit, and particularly to a technique of forming a preferable pattern, giving consideration to deformation of a panel.

With regard to display units such as liquid crystal display units, there has been progress in miniaturization and larger sized panels, while pattern formation on panels of various materials is being studied. Consequently it has become impossible to ignore panel deformation such as that which occurs with shrinkage due to the effect of heat in the course of manufacture, for example. Conventionally, to cope with such panel deformation, there is known a technique in which deformation of a pattern in a lower layer is measured and an upper pattern is drawn to fit the deformation (see Patent Document 1). This technique employs direct exposure equipment without using a mask and tries to form the upper pattern to fit deformation faithfully even when the lower pattern has been deformed from a rectangle into a quadrilateral without having parallel sides. Further, with regard to exposure equipment that uses a mask, there is known a technique in which an alignment error or optical distortion is corrected for alignment with a substrate.

Patent Document 1: Japanese Unexamined Patent Application Laid-open No. 2001-142225

A liquid display panel is manufactured by overlaying a Thin Film Transistor (TFT) panel and a Color Filter (CF) panel. Generally, the TFT panel and the CF panel are produced through separate processes. The TFT panel has transistors, capacitor parts, circuits, and the like, on a glass panel. The transistors become switching elements; each of the capacitor parts stores electric charge and generates an electric field; and the circuits connect these transistors and capacitor parts. Further, the capacitor parts play a role as pixels that intercept or transmit light. Since the transistors and the circuits do not easily transmit light, they are thus often arranged around the pixels. The CF panel has red, blue and green color resist parts arranged at places corresponding to the pixels in the TFT panel. Further, the CF panel has a light shielding part called a Black Matrix (BM) arranged at places corresponding to the transistors and the circuits in the TFT panel. To overlay the TFT panel and the CF panel together, a circuit layer pattern, through which light is not easily transmitted, of the TFT panel is aligned with a BM pattern of the CF panel, when the TFT panel and the CF panel are stuck together. This is done to improve visibility and the like, since the circuit layer pattern and the BM pattern both do not easily transmit light. The circuit layer is formed using aluminum (Al) or the like.

Here, when overlaying accuracy or processing accuracy of the TFT panel or the CF panel is not enough, then the pixel parts of the TFT panel overlaps the BM part of the CF panel, and a good aperture rate cannot be obtained.

According to the above-described alignment method, an upper pattern is formed by exposure, following lower pattern deformation caused by distortion of the panel. Accordingly, repeated exposures of many layers cause a mechanical error or a position measurement error at the time of alignment in each layer, so that the degree of deformation of each pattern shape generally tends to increase. As the deformation increases, the fabrication accuracy of the TFT panel becomes worse, and pixels of the TFT panel overlap the BM part of the CF panel at the time of overlaying the CF panel and the TFT panel together.

Here, occurrence of the above-described overlap between the pixels of the TFT panel and the BM part of the CF panel can be reduced to some degree by designing the shape of the CF panel giving considering to the way in which the TFT panel is deformed. However, deformations of TFT panels are not uniform for all panels, and vary from panel to panel. Thus, when exposure is performed to follow deformation of each panel, a mechanical error or a position measurement error is caused at the time of alignment with a substrate layer, and pattern deformation of the TFT panel becomes larger as processes proceed. This leads to overlap between the pixels of the TFT panel and the BM part of the CF panel. Thus, it is necessary to take a countermeasure allowing a margin, such as by setting the width of the BM part wider at the time of design. This, however, becomes an undesirable element for product specifications such as aperture rate and the like.

Thus, to reduce variation in pattern shapes in a TFT panel, what is required is, not a simple exposure method that faithfully follows deformation of a pattern in a lower layer, but an exposure method that suppresses variation in pattern shapes at the time of exposure.

An object of the present invention is to provide an exposure method that suppresses variation in pattern shapes at the time of exposure.

SUMMARY OF THE INVENTION

To solve the above problem, the present invention provides an exposure method that suppresses variation of pattern arrangement in an upper layer.

For example, in a first mode of the present invention, a manufacturing method for a display unit is provided, wherein: a reference layer that forms a reference for a pattern arrangement is determined among layers formed on a panel; and pattern arrangement in a layer above the reference layer is determined using a value obtained from distribution of pattern arrangement in the reference layer.

Further, in a second mode of the present invention, a manufacturing method for a display unit is provided, wherein: a reference layer that forms a reference for a pattern arrangement is determined among layers formed on a panel; and the further a layer is above the reference layer, the closer a pattern arrangement in the layer comes to a pattern arrangement in the reference layer.

Further, in a third mode of the present invention a manufacturing method for a display unit is provided, comprising: a reference pattern arrangement acquisition step of acquiring a pattern arrangement that forms a reference for a pattern in a layer to be formed on a panel; a misalignment calculation step of calculating a misalignment between a pattern arrangement in a layer that has been already formed on the panel and is a reference for pattern arrangement, and the reference pattern arrangement acquired in the reference pattern arrangement acquisition step; a correction parameter calculation step of calculating a correction parameter to be applied to the reference pattern arrangement to minimize the misalignment; a correction quantity calculation step of calculating a correction quantity used for correcting the correction parameter; a correction parameter correction step of correcting the correction parameter using the correction quantity calculated in the correction quantity calculation step; a tolerance judgment step of judging whether the corrected correction parameter lies within a predetermined tolerance; and a pattern formation step, in which, when the corrected correction parameter has been judged to lie within the tolerance in the tolerance judgment step, the corrected correction parameter is used to correct the reference pattern arrangement, and the corrected pattern arrangement is used to form the pattern in the layer to be formed.

Further, in a fourth mode of the present invention, a method for manufacturing is provided for a display unit in which a first panel and a second panel are overlaid together, wherein: information on a pattern arrangement in a layer formed in a manufacturing process of the first panel is used to determine a pattern arrangement formed in a manufacturing process of the second panel.

DETAILED DESCRIPTION

Below, one embodiment of the present invention will be described referring to the drawings.

Figure 1:
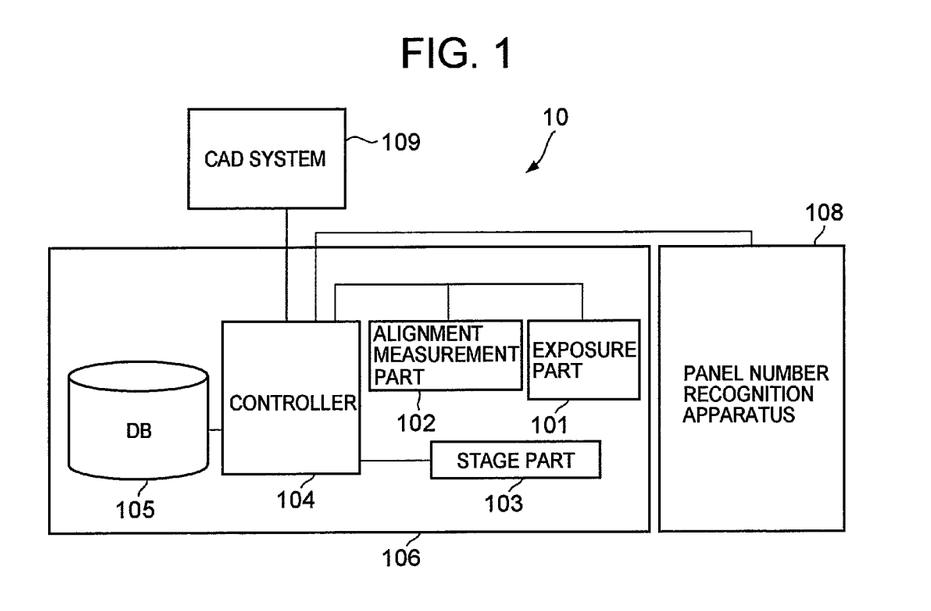
FIG. 1 is a block diagram showing an exposure system.

FIG. 1 is a block diagram showing an exposure system 10 used in the present invention. The exposure system 10 comprises: an exposure part 101 provided with exposure equipment; an alignment measurement part 102 for measuring alignment; a stage part 103 for mounting a panel; a controller 104 that controls the position of the stage, sets exposure conditions, processes alignment measurements, and performs other processing; a database 105 for storing various pieces of data; a housing 106 that houses the mentioned components and provides a suitable environment; and a panel number recognition apparatus 108.

The controller 104 obtains exposure conditions such as a number of a panel to be exposed (a product name or a lot name) and a number of an exposure process. The controller 104 may obtain these pieces of information from an input terminal (not shown) or an external information processing apparatus.

The exposure system 10 is coupled to a CAD system 109 that generates a pattern (a drawing pattern) used for drawing onto a panel.

Figure 2:
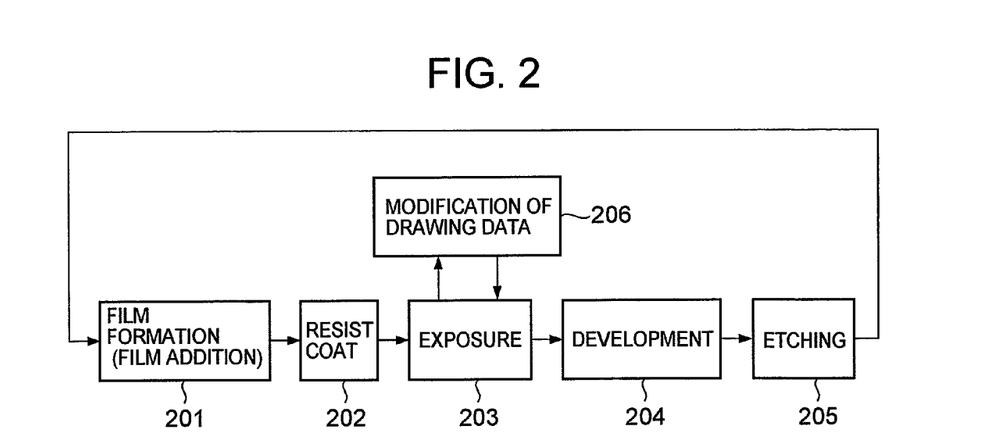
FIG. 2 is a diagram showing flow of a pattern formation process for a panel.

FIG. 2 shows flow of a pattern formation process on a panel. The pattern formation process comprises a film formation process (film addition) 201, a resist coating process 202, an exposure process 203, a development process 204, and an etching process 205. These processes are repeated by the number of patterns to be formed. If necessary, an ion implantation process (not shown), an annealing process (not shown) or the like may be added.

Among these pattern formation processes, the exposure system 10 performs the exposure process 203 employing the below-described asymptotic alignment method. To that end, the exposure system 10 also performs a process 206 for modifying exposure data.

Figure 3:
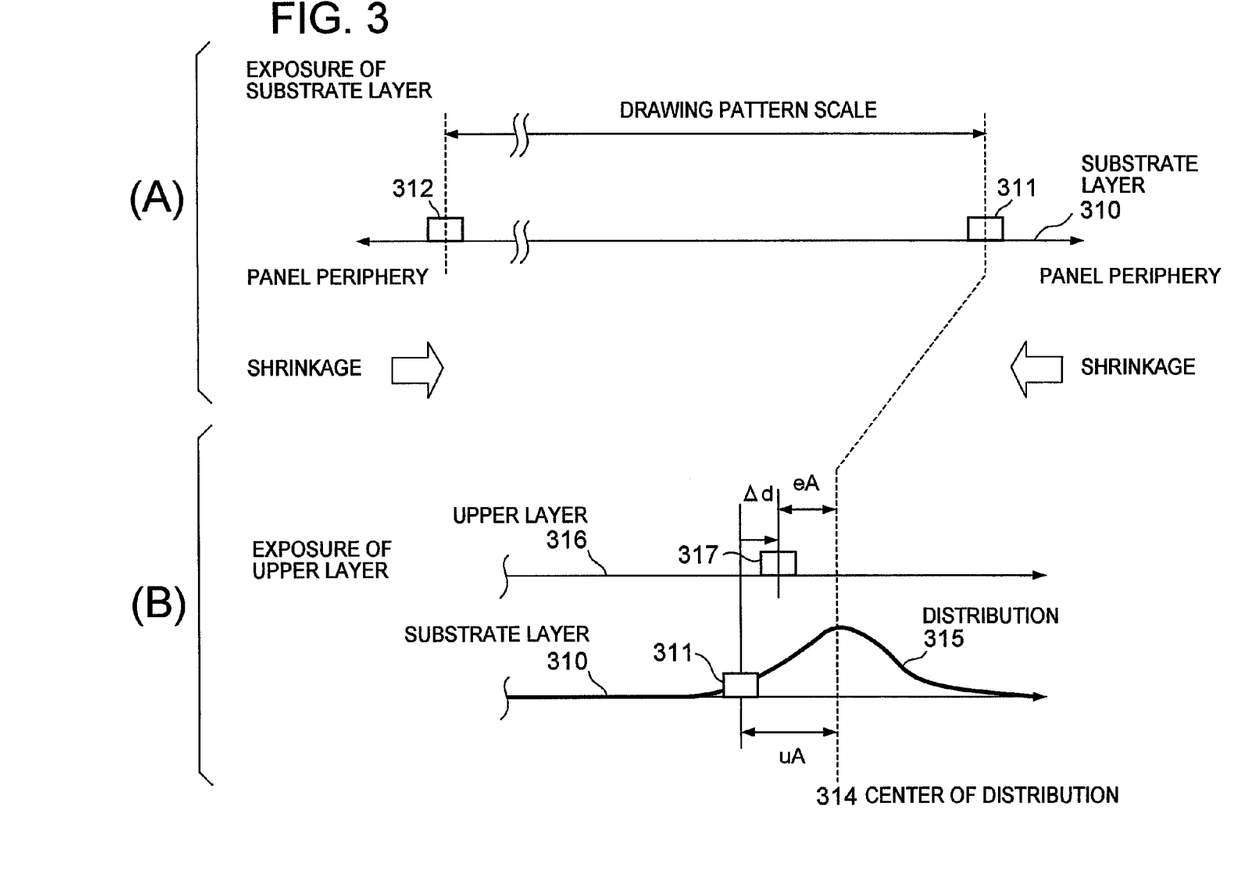
FIG. 3 is a diagram explaining an outline of an asymptotic alignment method.

FIG. 3 is a schematic diagram showing the concept of the asymptotic alignment method.

In the present invention, the asymptotic alignment method is a method in which an arrangement error from a pattern on a reference layer becomes smaller each time pattern formation is repeated. In the present embodiment, the higher a layer in which a pattern is formed is, the closer the pattern gradually comes to the arrangement pattern of a lower layer that is the reference.

Here, a description is given of implementation realized by an exposure method (hereinafter, referred to as direct exposure) of drawing directly with a laser or the like, using, not mask exposure employing a mask, but data (exposure data) for drawing a pattern. However, an exposure method using a mask is substantially the same.

To simplify the explanation, a description will be given taking as an example panel deformation, a case in which the panel shrinks as processes are carried out.

In the example of FIG. 3, a substrate layer 310 is a reference layer for pattern arrangement in an upper layer 316. The reference layer for pattern arrangement is determined in advance.

As shown in the upper portion (A) of FIG. 3, first the exposure system 10 draws, as the substrate layer 310 of a panel, a pattern including alignment marks 311, 312. The alignment marks 311, 312 are written symmetrically about the center of the panel. Thus, the distance from the center of the panel to the alignment mark 311 is the same as the distance from the center of the panel to the other alignment mark 312. When the panel shrinks, the distance between the two alignment marks becomes shorter. A ratio of the distance between the two alignment marks 311, 312 to a predetermined design distance is a scaling ratio (shrinkage ratio) owing to shrinkage. Here, the predetermined design distance is a distance in the original drawing pattern (drawing pattern assuming no panel shrinkage) generated by the CAD system 109.

As shown in the lower portion (B) of FIG. 3, it is assumed that shrinkage of the panel occurs before exposure of the upper layer 316 and that the alignment mark 311 in the substrate layer 310 has moved. Since variation arises in shrinkage of the panel, the alignment mark 311 can move within a range of a variation distribution 315. Although not illustrated, the position of the alignment mark on an opposite side can move within a variation distribution range similar to the variation distribution 315.

In this case, in conventional methods a pattern is drawn in the upper layer, by modifying the scaling ratio of the drawing pattern so as to follow the shrinkage of the panel. In other words, the scaling ratio of the drawing pattern is modified such that the alignment mark 317 in the upper layer 316 coincides with the moved alignment mark 311 in the substrate layer 310.

On the other hand, in the present embodiment, a pattern in an upper layer is written such that its displacement from the arrangement of the pattern in the substrate layer 310 is smaller.

The above-mentioned distribution 315 can be obtained by statistical processing of position measurements of the alignment marks 311 in the substrate layers 310 of panels processed in the past. The distribution 315 has a center of distribution 314. The present embodiment uses this center of distribution 314. The method of obtaining the center of distribution 314 will be described later.

In the example of FIG. 3, the alignment mark 317 in the upper layer 316 is made to approach the center of distribution 314 of the alignment mark 315 in the substrate layer 310. This is done not by making the alignment mark 317 in the upper layer 316, which is laid next on the substrate layer 310, coincide with the center of distribution 314, but rather such that the higher a layer pattern is, the closer the alignment mark in the layer comes to the center of distribution 314.

In detail, the exposure system 10 determines the scaling ratio for correcting a drawing pattern in the upper layer 316 such that the alignment mark 311 in the upper layer 316 is located at a distance of eA from the center of distribution 314 in a direction of the alignment mark 311 in the substrate layer 310. Here, the distance eA is obtained by subtracting an asymptotic quantity Δd from the distance uA between the center of distribution 314 and the alignment mark 311 in the substrate layer 316. The asymptotic quantity Δd will be described later.

By this operation, each time a layer is laid over another, a pattern in the upper layer approaches the arrangement of the pattern in the reference layer. As a result, it is possible to reduce deviation in arrangements of surface patterns among a plurality of produced panels.

Deviation in shrinkage of panels is not necessarily constant over a long period of time. Thus, the controller 104 records a history of degrees of shrinkage (scaling ratios) of panels, and obtains deviation of shrinkage of panels on the basis of the history periodically (for example, at intervals of one week or one month).

Further, the reference layer is not limited to the lowest layer. Any layer that is formed before the exposure process in question can be a reference layer. Further, it is not necessary that the same layer is always the reference layer, and the reference layer may be changed in turn as layers are laid one over another.

Figure 4:
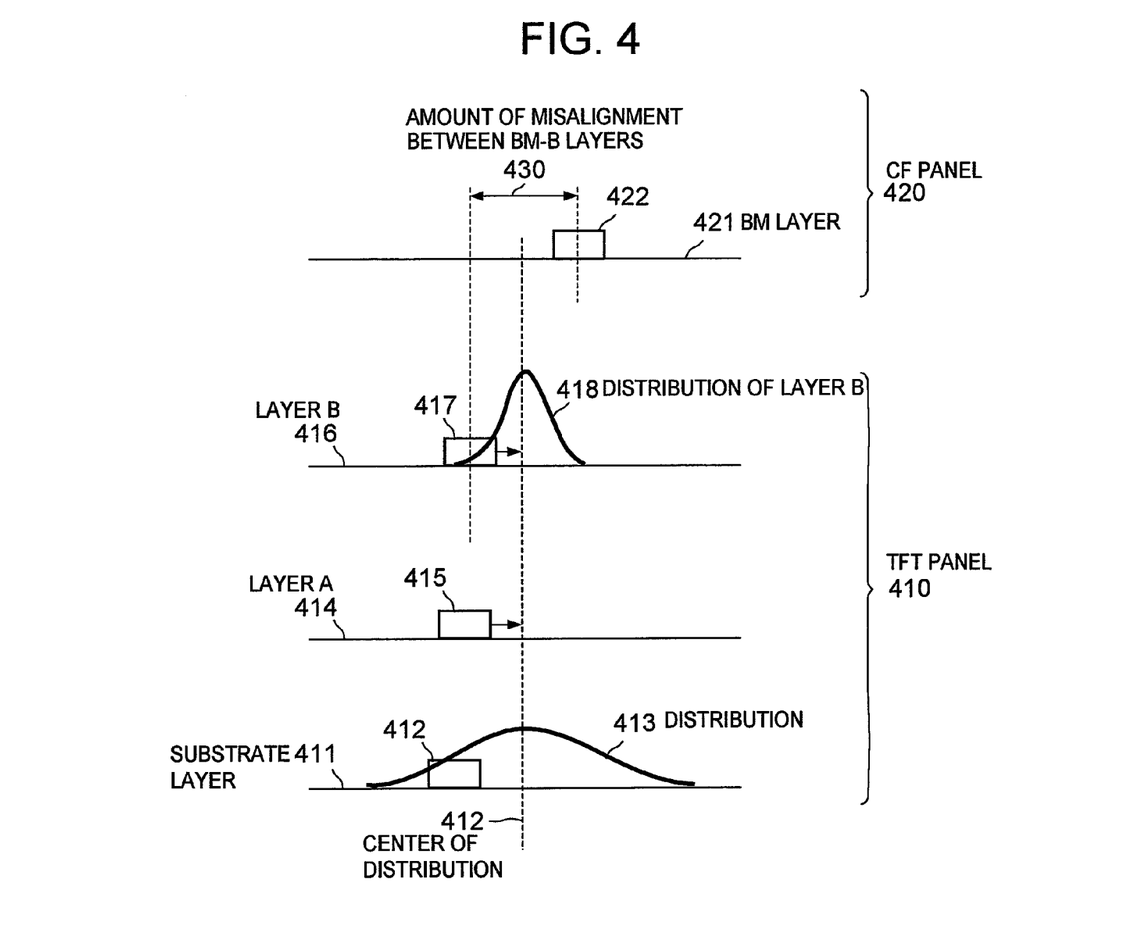
FIG. 4 is a diagram showing an effect of the asymptotic alignment method.

FIG. 4 is a diagram showing an effect of the asymptotic alignment method schematically.

It is assumed that a substrate layer 411, a layer A 414 and a layer B 416 are formed in this order from the bottom in a TFT panel 410. For example, the layer B is a circuit layer and formed of aluminum. FIG. 4 shows positional relation of alignment marks in those layers after the manufacturing process of the TFT panel 410 have been finished, or deformation of the panel has been finished.

The CF panel 420 is manufactured by a process separate from the TFT panel 410. These panels 410 and 420 are stuck together after the manufacturing processes of both panels are finished. In overlaying these panels together, a pattern of the black matrix layer (BM layer) 421 on the CF panel 420 is aligned with a pattern of the circuit layer (layer B) 416 on the TFT panel 410. Thus, the smaller the deviation of the pattern in the layer B 416 is, the smaller the deviation in misalignment between the BM layer 421 and the layer B 416 is.

According to the asymptotic alignment method, each time a layer is laid over another layer, a pattern is aligned to a greater extent with the arrangement of the pattern in the reference layer. Therefore, the layer A 414 is formed on the basis of the substrate layer 411, and then the layer B 416 on the basis of the layer A 414. The alignment marks 412, 415 and 417 in the respective layers overlap as shown in the figure. Thus, the distribution 418 of the alignment mark 417 in the layer B becomes smaller than the distribution 413 of the substrate layer's mark 412. As a result, the panel having a smaller deviation of the pattern in the circuit layer (layer B) 416 is obtained, and deviation of a quantity of alignment error between the CF panel 420 and the TFT panel 410, that is, a quantity of alignment error 430 between the BM layer and the layer B (circuit layer), is improved.

Figure 5:
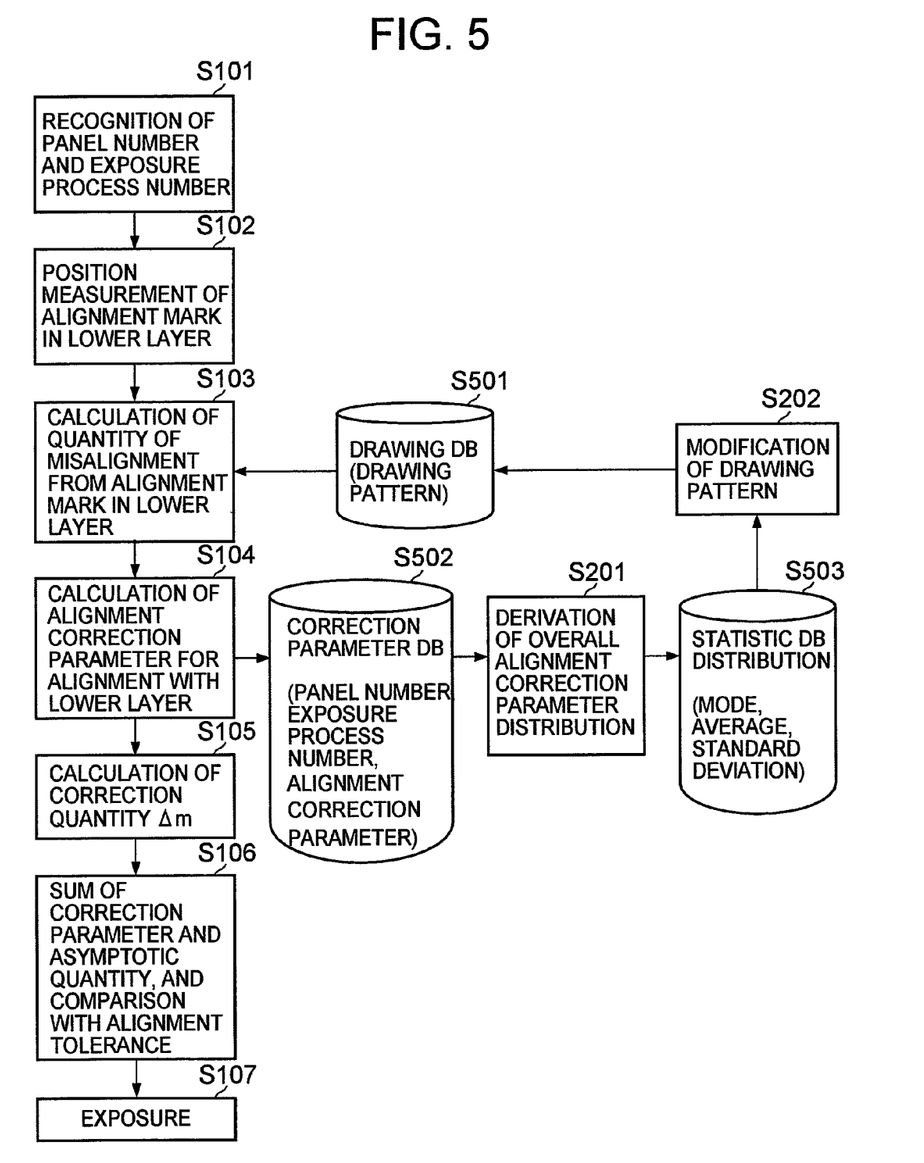
FIG. 5 is a diagram showing processing flow of an exposure process.

FIG. 5 is a flowchart showing flow of the exposure process. Here, alignment correction parameters are used to modify a drawing pattern, and then the modified drawing pattern is used for exposure.

A description will be given taking an example of the exposure process where a pattern of an upper layer 316 is additionally formed on the TFT panel in which the substrate layer 310 has been formed, as shown in FIG. 3.

In the following, the center of distribution of the scaling ratio (shrinkage ratio) is referred to as a "reference value".

The controller 104 obtains a panel number of a panel received on the stage part 103 and a number of an exposure process to be performed (S101). As described above, in the manufacturing process of a panel, a plurality of exposure processes are repeated for one panel. Each exposure process is given a name or a number, and exposure conditions are set for each exposure process.

Next, the controller 104 measures the position of the alignment mark 311 of the substrate layer 310 of the panel through the alignment measurement part (S102).

Next, the controller 104 obtains, from a drawing database 501, a pattern to be drawn on an upper layer that is to be formed, corresponding to the exposure process number, and obtains an arrangement misalignment amount with respect to the pattern in the substrate layer 310 (S103). As described later, a drawing pattern stored in a drawing database 501 is adjusted such that its alignment mark is located at the position of the center of distribution 314 of the alignment mark 311 of the substrate layer 310 that is the reference layer. In the example of FIG. 3, the controller 104 calculates a misalignment error uA between the position of the alignment mark of the drawing pattern (i.e. the position of the center of distribution 314) and the position of the alignment mark 311 of the substrate layer 310

Next, the controller 104 calculates and records correction parameters (referred to as alignment correction parameters) to be applied to the drawing pattern obtained in S103, in order to minimize the alignment error between the drawing pattern and the substrate 310 (S104).

Figure 6A:
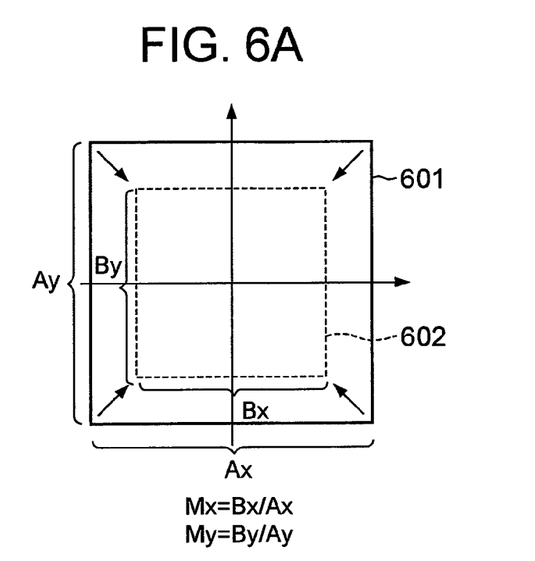
FIG. 6A is a diagram explaining alignment correction parameters.
Figure 6B:
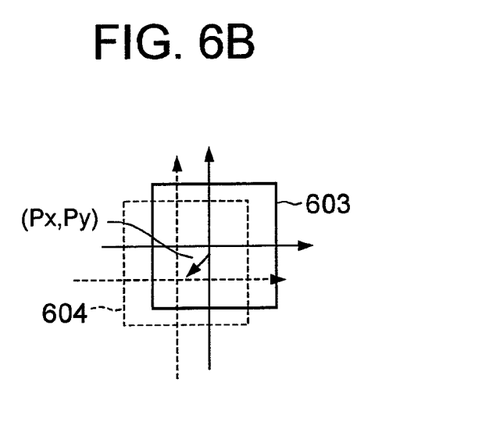
FIG. 6B is a diagram explaining alignment correction parameters.
Figure 6C:
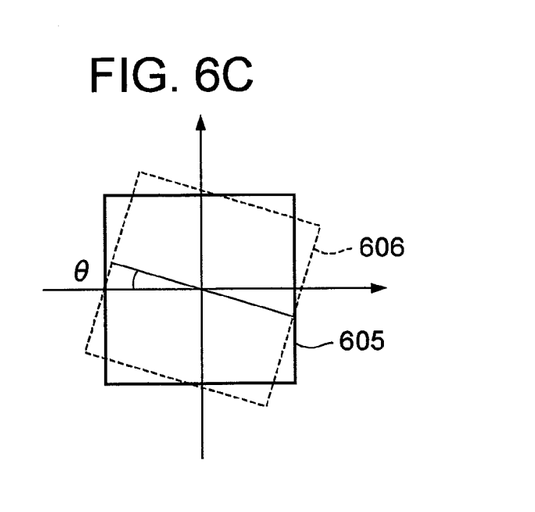
FIG. 6C is a diagram explaining alignment correction parameters.

As shown in FIG. 6, types of displacement between the substrate layer 310 and the upper layer 316 include expansion/shrinkage, offset (i.e. translation), and rotation. Thus, as the alignment correction parameters, the controller 104 calculates components such as a scaling ratio (Mx, My), offset (Px, Py), rotation (θ) and the like, of the panel. Calculation of these components can be performed by known method.

FIG. 6A shows a panel 602 that has shrunk from an original panel 601. Scaling ratios of shrinkage (Mx, My) are expressed by Mx=Bx/Ax, My=By/Ay, i.e. ratios of a distance between a pair of alignment marks 311 and 312 symmetrical about the center of the panel, to the distance in the original panel.

FIG. 6B shows a panel 604 that has been translated from an original panel 603. FIG. 6C shows a panel 606 that has been rotated from an original panel 605.

The controller 104 records the thus-obtained alignment correction parameters together with the panel number and the exposure process number in a correction parameter database 502.

If the thus-obtained alignment correction parameters are used as they are, as in conventional techniques, a pattern in an upper layer is formed following the arrangement of the pattern in the substrate layer 310. In other words, the alignment mark 317 in the upper layer 316 coincides with the alignment mark 311 in the substrate layer 310. On the other hand, in the present embodiment, the alignment correction parameters are modified in the processing of S105 and S106.

Here, before describing processing in and after S105, a drawing pattern stored in the drawing database 501 will be described. As described above, the correction parameter database 502 accumulates alignment correction parameters for each exposure process number. Thus, the controller 104 performs the following processing periodically.

First, the controller 104 derives distributions of alignment correction parameters for each exposure process number. Here, distribution means statistics such as a reference value (center of distribution), average, standard deviation, and the like. The controller 104 derives a distribution for each component: scaling ratio, offset, rotation and the like, and records the derived distribution in the statistic database 503 (S201). Further, the controller 104 modifies a drawing pattern stored in the drawing database 501 on the basis of the reference value of the scaling ratio corresponding to the exposure process number and the like (S202). For example, the controller 104 modifies a currently-stored drawing pattern (or an original drawing pattern generated by the CAD system 109 if the processing of S202 has not been performed in the past) by multiplying it by the reference value of scaling ratio. The alignment mark 316 of the modified drawing pattern coincides with the center of distribution 314 of the alignment mark 311 in the substrate layer. Then, the controller 104 registers the modified drawing pattern in association with the exposure process number into the drawing database 501. The recorded drawing pattern is used when the process of S103 is performed next time.

Since the original design drawing pattern is used as the basis for scaling ratio calculation, the controller 104 does not delete the original drawing pattern even when the drawing pattern is modified.

It is not necessary that the controller 104 performs the processing of S201 and S202 each time one panel is processed. The controller 104 can perform the processing of S201 and S202 at suitable intervals, for example, for each prescribed period, for each production lot, each day, or the like.

Now, the processing in and after S105 will be described. The controller 104 calculates a correction quantity Δm used for correction of the alignment correction parameters obtained in S103 (S105). The correction quantity Δm corresponds to the asymptotic quantity Δd of the distance of the alignment mark 317 in the example of FIG. 3.

A method of calculating the correction quantity Δm will be described referring to FIG. 7.

FIG. 7(a) illustrates that panel size changes as processes proceed. Change of panel size is expressed as a transition of the scaling ratio. The X-axis 701 shows processes, and the Y-axis 702 shows scaling ratio.

The transition diagram shown in FIG. 7(a) can be easily made by using the reference values of scaling ratios stored in the statistic database with respect to panels processed in the past and scaling ratio values in the alignment correction parameters stored in the correction parameter database 502 with respect to each process.

Figure 7:
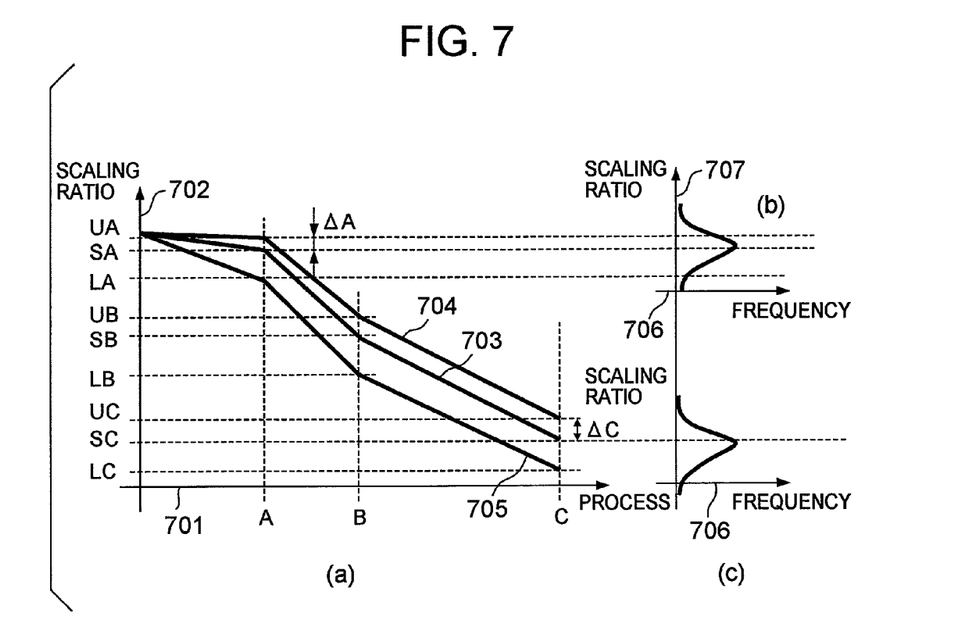
FIG. 7 is a conceptual diagram showing transition for each scaling ratio process.

FIG. 7 shows scaling ratios to the original drawing pattern (the drawing pattern in the case of no shrinkage of the panel) generated by the CAD system 109.

Here, a description will be given taking an example where the process C is to be performed. The process C is, for example, a process in which processing of a target layer of a TFT panel is performed.

The scaling ratio transition 703 relates to a panel (referred to as the panel S) for which a scaling ratio is equal to a reference value in the process C. The scaling ratio transition 704 relates to a panel (referred to as the panel U) for which a scaling ratio is larger than a reference value in the process C. The scaling ratio transition 705 relates to a panel (referred to as the panel L) for which a scaling ratio is smaller than a reference value in the process C.

Scaling ratios of the panel S in processes A, B and C are written as SA, SB and SC, respectively. Similar notation is employed for the panels U and L also.

FIGS. 7(b) and 7(c) show distributions of scaling ratio in the processes A and C, respectively. In FIG. 7(b), the X-axis 706 shows frequency, and the Y-axis 707 scaling ratio. The same is true with respect to FIG. 7(c). Acquisition of the statistics in S201 of FIG. 5 corresponds to acquisition of distributions in FIGS. 7(b) and 7(c). Generally, the panel U, which shows larger scaling ratio than that the panel S shows in the process A for forming a lower layer, shows larger a scaling ratio than the panel S shows in the process C also. Further, the panel L, which shows a smaller scaling ratio than the panel S shows in the process A, shows a smaller scaling ratio than the panel S shows in the process C also.

Now will be described a method of calculating a correction quantity Δm for a scaling ratio in the case where the process C is performed for the panel U in FIG. 7.

In the following, ΔC shows a difference between SC and UC.

$$\Delta C = SC - UC \qquad \text{Eq. 1}$$

Further, ΔC corresponds to the alignment correction parameter relating to a scaling ratio, which is obtained in S104.

Here, a correction quantity Δm is obtained by:

$$\Delta m = K * \Delta C \qquad \text{Eq. 2}$$

where K is a parameter obtained experimentally within the following value range:

$$-1 =< K =< 1 \qquad \text{Eq. 3}$$

The controller 104 can obtain the correction quantity Δm according to Eqs. 1, 2 and 3 before exposure is performed in the process C.

Figure 8:
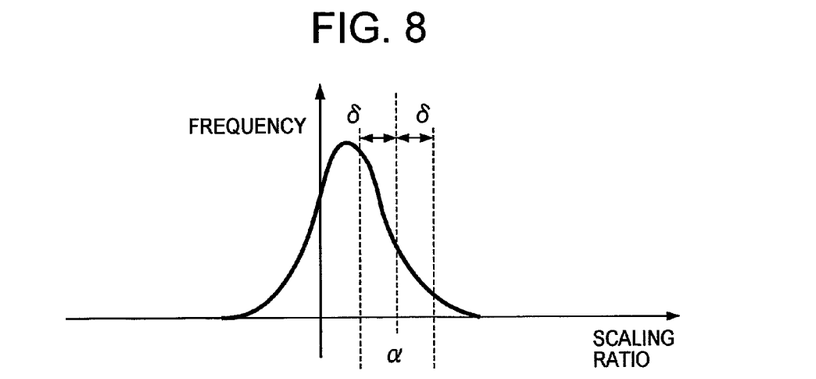
FIG. 8 is a diagram explaining a method of obtaining a reference value.

Next will be described a method of obtaining a reference value. FIG. 8 schematically shows a method of calculating a reference value, taking an example of distribution of a scaling ratio in the process C. The horizontal axis in FIG. 8 shows a scaling ratio in this case, and the vertical axis shows frequency. The symbol α is a value of the scaling ratio, and δ is an error factor including scaling ratio error of the exposure equipment and the like. A function expressing the frequency of the scaling ratio is written as t(x). T is a value of integral of t(x) from α−δ to α+δ.

$$T = \int_{\alpha-\delta}^{\alpha+\delta} t(x)dx \qquad \text{Eq. 4}$$

The controller 104 uses Eq. 4 to determine, as a reference value, the scaling ratio that gives the maximum value Tmax of T. The same method of deriving a reference value is used also in the other processes.

The description now returns to FIG. 5. Next, the controller 104 corrects the alignment correction parameters obtained in S104 by using the correction quantity Δm obtained in S105, and judges whether the result is within the tolerance (S106).

In detail, as for scaling ratio, the above-obtained scaling ratio correction quantity Δm is added to the alignment correction parameter obtained in S104.

The sum corresponds to the sum eA of the quantity of alignment error uA of the alignment mark and the asymptotic quantity Δd of the distance.

$$eA = uA + \Delta d \quad \text{Eq. 5}$$

The asymptotic quantity Δd of the distance corresponds to the value of the product of the size of the original drawing pattern and the scaling ratio correction quantity Δm.

Next, the controller 104 judges the propriety of the modified alignment correction parameters.

In detail, the controller 104 judges whether the following expression is satisfied or not, using the above sum eA.

$$eA^2 < PM^2 - MM^2 \quad \text{Eq. 6}$$

PM: alignment tolerance prescribed for each product
MM: distribution range of alignment of the exposure part 101 itself When the above expression is satisfied, the controller 104 judges that the alignment correction parameters are suitable. On the other hand, when the above expression is not satisfied, the controller 104 judges that the alignment correction parameters are unsuitable. The sum eA is replaced by eA=PM. Then, based on the sum eA, the controller 104 modifies the scaling ratio in the alignment correction parameters. In detail, the scaling ratio is modified such that the alignment mark 317 of the upper layer 316 is located at a position at a distance of the sum eA toward the center of the panel, from the center of distribution 314 of the alignment mark 311 of the substrate layer 320. For example, the scaling ratio in the alignment correction parameters is set to (Lx−eA)/Lx where Lx is the distance between the center of the panel and the center of distribution 314.

It is not necessary to derive a correction quantity Δm for rotation and offset. As for rotation and offset, the alignment correction parameters obtained in S104 are used.

Then, the controller 104 uses the final obtained alignment correction parameters to modify the exposure parameters obtained in S103. The controller 104 performs the exposure processing using the modified exposure parameters (S107).

Hereinabove, the flow shown in FIG. 5 has been described.

The description has been given taking the case where the asymptotic alignment method is applied to a manufacturing process of a TFT panel. As described above, even when the asymptotic alignment method is applied only to the manufacturing process of the TFT panel, distribution of a pattern in an upper layer of the TFT panel 410 (i.e. distribution 418 of the layer B in FIG. 4) becomes smaller when it is seen from the BM layer 421 as shown in FIG. 4. As a result, overlaying margin between the TFT panel 410 and the CF panel 420 can be improved.

Variation Embodiment 1

Next will be described an embodiment in which the asymptotic alignment method is applied to a manufacturing process of a CF panel. The idea of modifying drawing patterns in manufacturing a CF panel is similar to the method of modifying drawing patterns in the TFT panel manufacturing process shown in FIG. 5.

Figure 9:
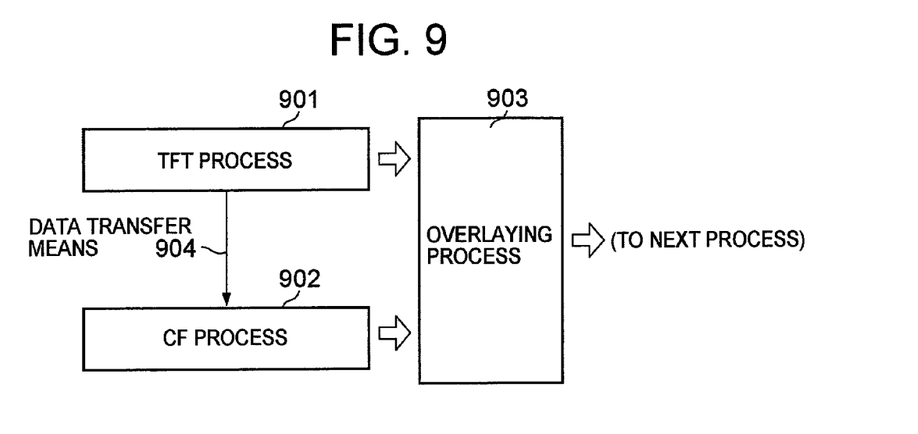
FIG. 9 is a diagram showing data transfer between a TFT panel manufacturing process and a CF panel manufacturing process.

However, as shown in FIG. 9, generally a manufacturing process 901 of a TFT panel and a manufacturing process 902 of a CF panel are separate processes, and overlaying process 903 is performed thereafter. This requires a means 904 for transferring the center of distribution of the reference layer for pattern alignment in the TFT panel manufacturing process 901 to the CF panel manufacturing process 902.

In detail, the controller 104 comprises a storage unit that has a first storage area for storing a reference value used in the TFT panel manufacturing process 901 and a second storage area for storing a reference value used in the CF panel manufacturing process 902. The controller 104 stores the center of distribution of the layer as the reference in the TFT panel manufacturing process 901 in the first storage area. In other words, the controller 104 stores a scaling ratio of a drawing pattern used for pattern formation in the uppermost layer in the TFT panel manufacturing process 901, with respect to the original drawing pattern. In the CF panel manufacturing process 902, the controller 104 transfers the value stored in the first storage area to the second storage area.

Then, in the CF panel manufacturing process 902, the controller 104 uses the value stored in the second storage area, as the reference value. That is, the controller 104 modifies the original drawing pattern for the BS layer in the case of no panel shrinkage, by multiplying it by the reference value (scaling ratio). Then, the controller 104 uses the modified drawing pattern to form the BS layer.

Figure 10:
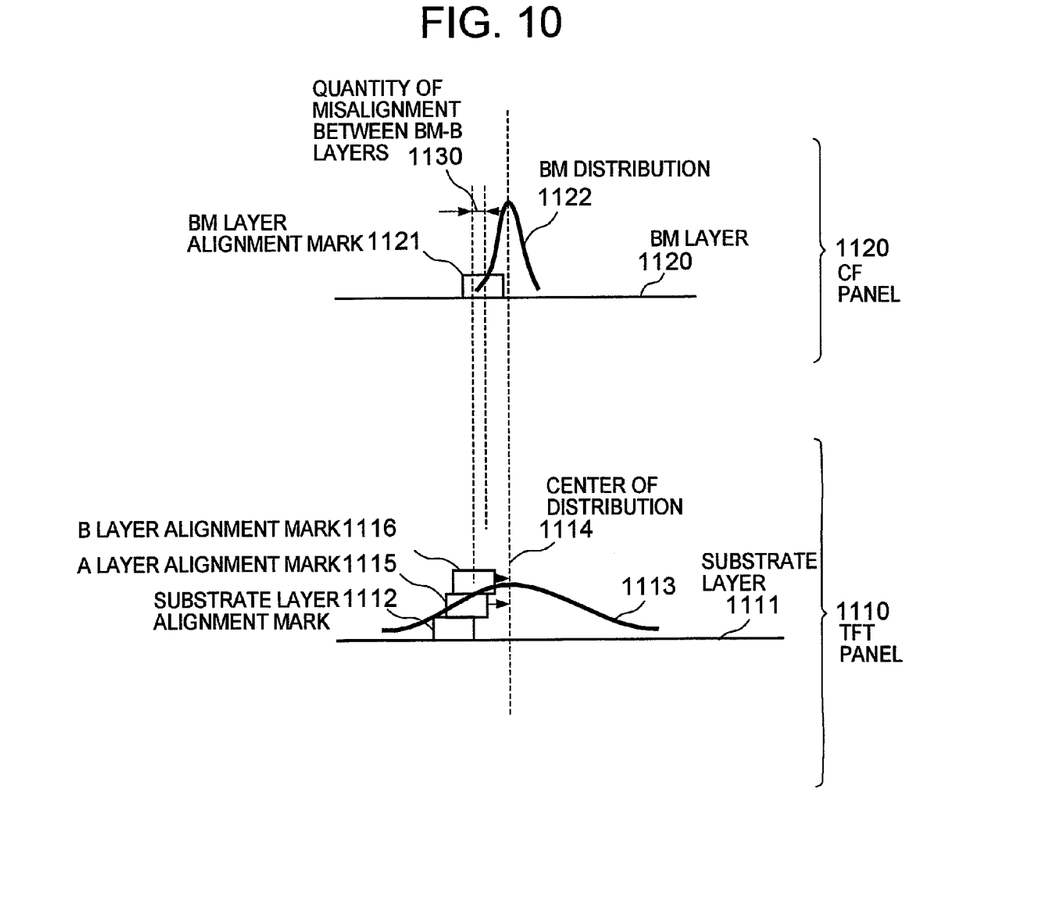
FIG. 10 is a diagram showing an effect of applying the asymptotic alignment method to both the TFT panel manufacturing process and the CF panel manufacturing process.

FIG. 10 illustrates a TFT panel 1110 in which a substrate layer 1111, a layer A, and a layer B have been formed. As shown in the figure, respective alignment marks 1112, 1115 and 1116 in these layers overlap each other.

A pattern in the CF panel is formed such that the center of distribution 1122 of the alignment mark 1121 in the BM layer 1120 coincides with the center of distribution 1114 of the distribution 1113 of the substrate layer 1111 in the TFT panel manufacture process. Since the drawing pattern in the BM layer 1120 is performed on the basis of the center of distribution, the misalignment amount between the BM layer 1120 and the layer B can be reduced. Thus, a margin of alignment between the BM layer and the layer B can be improved.

Variation Embodiment 2

The asymptotic alignment method can be applied to an exposure method using a mask.

Figure 11:
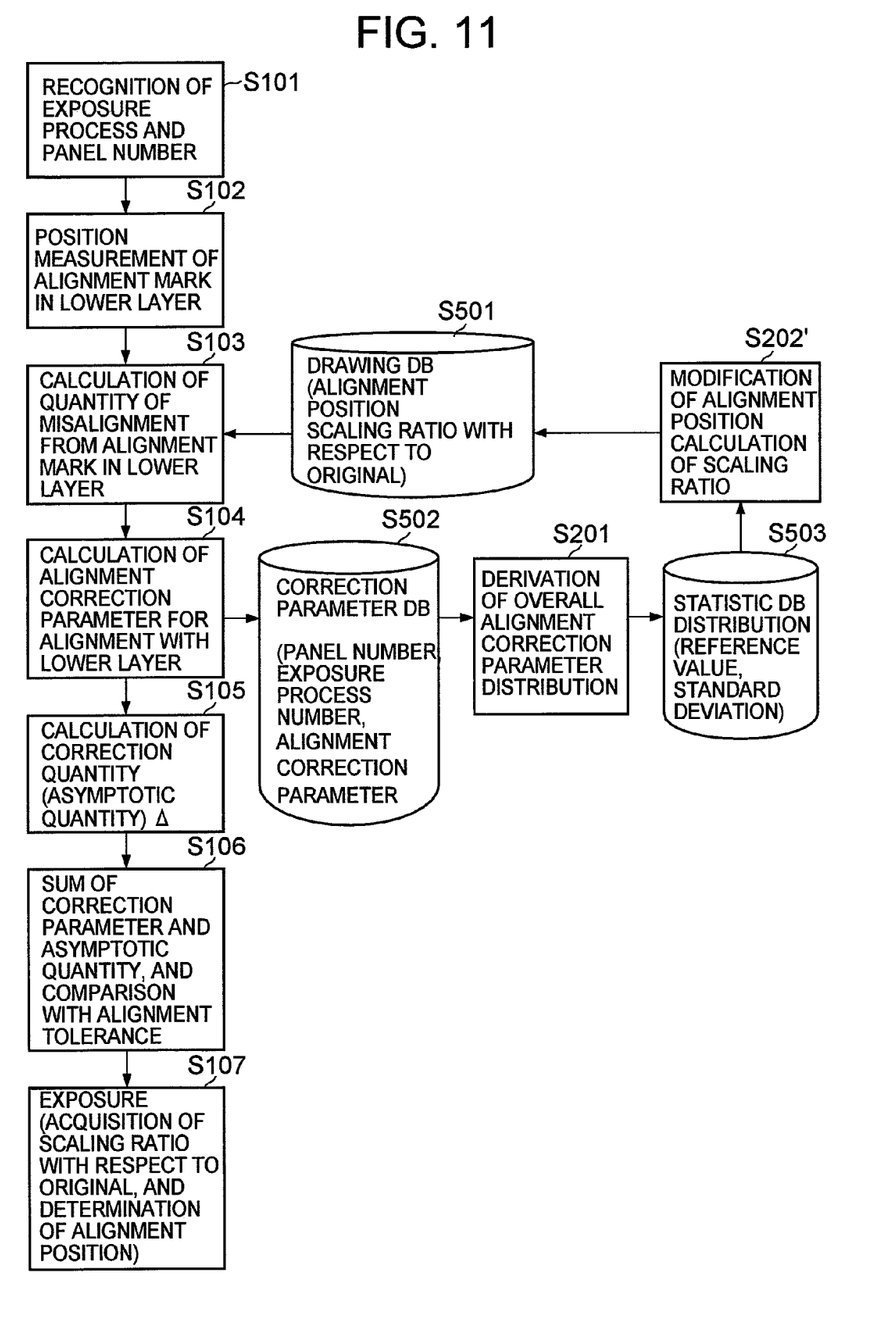
FIG. 11 is a diagram explaining a method of performing the asymptotic alignment method using mask exposure.

FIG. 11 shows processing flow in such a case. The processing flow shown in the figure is almost the same as that shown in FIG. 5. However, although a drawing pattern in the direct exposure method forms data for exposure and can be easily modified, a mask used for exposure cannot be modified. Accordingly, an alignment position of a mask is adjusted at the time of exposure, to form a desired pattern.

To that end, instead of the above-described processing in S202, the controller 104 obtains a mask alignment position for achieving the reference value (scaling ratio) calculated and stored in the statistic database 503. Furthermore, the controller 104 obtains a scaling ratio of the pattern formed at that alignment position, with respect to the pattern formed in the case where mask exposure is performed at the original alignment position. The obtained scaling ratio is stored in the drawing database 501. A relation between the scaling ratio and the mask alignment position is determined in advance.

Accordingly, the drawing database 501 stores, instead of data of a drawing pattern, a number of a mask used, a mask alignment position, and a scaling ratio of a pattern to be formed (a scaling ratio of a pattern formed by exposure at the mask alignment position, to the pattern formed by exposure at the original alignment position) for each exposure process number.

In S103, the controller 104 obtains the mask number and the mask alignment position corresponding to the exposure process number set in S101. The controller 104 obtains an arrangement misalignment between the already-formed pattern in the substrate layer (reference layer) and a pattern to be formed at the obtained mask alignment position.

Further, in S107, the controller 104 modifies the mask alignment position according to the alignment correction parameters, and performs mask exposure at the modified mask alignment position. That is, the controller 104 multiplies "the scaling ratio at the original alignment position" obtained in S103 by "the scaling ratio in the alignment correction parameters" calculated in S106, to obtain "the scaling ratio of the drawing pattern to the drawing pattern at the original alignment position". Thus, the controller 104 determines the mask alignment position such that the pattern of the obtained scaling ratio can be formed, and performs exposure.

Several embodiments have been described above.

According to the above embodiments, it is possible to reduce distribution in shapes of a TFT panel. As a result, leeway in design margin is produced. Furthermore, since leeway is also realized in manufacturing margin, improvement in yield can be anticipated, leading to cost reduction.

The present invention is not limited to the above embodiments, and various modifications are possible.

For example, size and shape of panels may be recognized by using an inspection apparatus other than exposure equipment.

Further, the above embodiments are applied to the manufacture of a liquid crystal display unit. However, the present invention can be applied to processing of other display units, printed circuit boards, semiconductor devices, and the like, in which panel deformation affects processing accuracy.

A panel includes a print circuit board, a panel of a display unit, a semiconductor wafer and the like.

The invention claimed is:

1. A manufacturing method for a display unit, wherein:
a reference layer that forms a reference for a pattern arrangement is determined among layers formed on a panel; and
pattern arrangement in a layer above the reference layer is determined using a value obtained from pattern arrangement distribution in the reference layer;
wherein the value is obtained by steps of:
recording information on the pattern arrangement in the reference layer for a plurality of panels;
obtaining a distribution of the pattern arrangement in the reference layer based on the recorded information that corresponds to a measured deformation in the reference layer;
calculating the value by a predetermined method from the obtained distribution of the pattern arrangement.

2. A manufacturing method for a display unit according to claim 1, wherein:
the value is obtained from a pattern arrangement whose frequency is highest.

3. A manufacturing method for a display unit, wherein:
a reference layer that forms a reference for a pattern arrangement is determined among layers formed on a panel; and the further a layer is above the reference layer, the closer a pattern arrangement in the layer above the reference layer comes to a pattern arrangement in the reference layer,
wherein the pattern arrangement in the layer above the reference layer is determined using value obtained by step of:
recording information on the pattern arrangement in the reference layer for a plurality of panels;
obtaining a distribution of the pattern arrangement in the reference layer based on the recorded information that corresponds to a measured deformation in the reference layer and in the layer above the reference layer;
calculating the value by a predetermined method from the obtained distribution of the pattern arrangement.

4. A manufacturing method for a display unit according to claim 3, wherein:
the value is obtained from a pattern arrangement whose frequency is highest.

5. A manufacturing method for a display unit, comprising:
an information acquisition step of acquiring information on a pattern arrangement in a reference layer for a plurality of panels;
a distribution acquisition step of acquiring distribution of the pattern arrangement in the reference layer based on a recorded information that corresponds to a measured deformation in the reference layer;
a misalignment calculation step of calculating a misalignment between a pattern arrangement in a layer that has been already formed on the panel and is a reference for pattern arrangement, and the reference pattern arrangement acquired in the reference pattern arrangement acquisition step;
a correction parameter calculation step of calculating a correction parameter to be applied to the reference pattern arrangement to minimize the misalignment;
a correction quantity calculation step of calculating a correction quantity used for correcting the correction parameter;
a correction parameter correction step of correcting the correction parameter using the correction quantity calculated in the correction quantity calculation step;
a tolerance judgment step of judging whether the corrected correction parameter lies within a predetermined tolerance; and
a pattern formation step, in which, when the corrected correction parameter has been judged to lie within the tolerance in the tolerance judgment step, the corrected correction parameter is used to correct the reference pattern arrangement, and the corrected pattern arrangement is used to form the pattern in the layer to be formed.

6. A manufacturing method for a display unit by overlaying a TFT panel and a CF panel together, wherein:
a reference layer that forms a reference for a pattern arrangement is determined among layers formed on the TFT panel; and
a value obtained from distribution of a pattern arrangement in the reference layer is used to determine a pattern arrangement in a layer of the CF panel based on measuring a deformation in the TFT panel; wherein:

the value is obtained by steps of:
recording information on the pattern arrangement in the TFT panel for a plurality of panels;
obtaining a distribution of the pattern arrangement in the TFT panel based on the recorded information that corresponds to the measured deformation in the TFT panel; and
calculating the value by a predetermined method from the obtained distribution of the pattern arrangement.

7. A manufacturing method for a display unit according to claim 6, wherein:
information on the pattern arrangement in a layer formed in a manufacturing process of the TFT panel is used to determine the pattern arrangement formed in a manufacturing process of the CF panel.

* * * * *